United States Patent [19]

Petersen, Jr.

[11] 3,984,935
[45] Oct. 12, 1976

[54] CHAMBER ICE FISHING POLE

[76] Inventor: Harry Petersen, Jr., 1860 Lark Lane, Waterloo, Iowa 50701

[22] Filed: Mar. 17, 1975

[21] Appl. No.: 559,270

[52] U.S. Cl. ................................. 43/17; 43/19.2
[51] Int. Cl.² .................................... A01K 87/00
[58] Field of Search .......... 43/17, 24, 16, 15, 17.5

[56] References Cited
UNITED STATES PATENTS

| | | | |
|---|---|---|---|
| 2,045,063 | 6/1936 | Baranowski | 43/16 |
| 2,735,208 | 2/1956 | Bartletti | 43/24 |
| 2,970,400 | 2/1961 | Noun | 43/17 |
| 3,024,560 | 3/1962 | Clark | 43/17 |
| 3,213,561 | 10/1965 | Roemer | 43/17 |

Primary Examiner—Louis G. Mancene
Assistant Examiner—Peter K. Skiff

[57] ABSTRACT

This invention relates to a set pole for ice fishing.

The object of this invention is to provide an air chamber consisting of a pipe or suitable hollow object having two ends and a support means for a set pole, and said support means holds the pole in a vertical position in an ice fishing hole, and said one end of pole receives the fishermans choice of fishing gear and is adapted to receive a fishline therein through the surface of the pole and said end extends above the ice, and said other end receives a rubber seal and said seal provides the means for a fishline to operate within the pole and said sealed end provides an air chamber when submerged in the water for ice fishing.

1 Claim, 3 Drawing Figures

CHAMBER ICE FISHING POLE

BACKGROUND OF INVENTION

The needs for a set pole to fish in subzero weather is well known, and the problem is to keep the line from freezing in the water of an ice fishing hole, or position the fishing gear in the water below the ice when you set the pole.

This invention provides the improvement in an apparatus to fish within a hole in the ice with a set pole, with an air chamber for the fish line to be operated through, and the fishing gear will be above the ice, and the chamber ice fishing pole will be easy to handle and operate in cold weather.

This invention has been tested successfully and will be easy to manufacture from available materials. This improvement in a set pole for ice fishing consists of a pipe or suitable hollow object, the shape of which is a matter of choice, affixing a rubber seal to one end, and said seal must fit the shape of the one end of pipe or suitable hollow object firmly, and when a fish line is pierced through said seal it will remain water proof. The seal used should be of rubber or a like material. The end of pipe or suitable hollow object receiving the seal will be the submerged end. You affix support means to support the chamber set pole at the proper depth. The chamber ice fishing pole will allow a fisherman to use his reel on the pole if he desires to do so, or can be affixed with a holding means for storage area for fish line, and a fisherman may affix a signal device to alert him to a bite.

The foregoing objects and such further objects as may appear herein, or be hereinafter pointed out, together with the advantages of this invention will be more fully discussed and developed in the more detailed description of the accompanying drawings.

DESCRIPTION OF THE PREFERRED EMBODIMENTS

Figure 3:
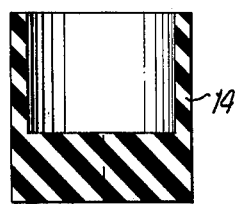
FIG. 3 is a sectional view of the rubber seal used to cover the submerged end of the pole.
Figure 2:
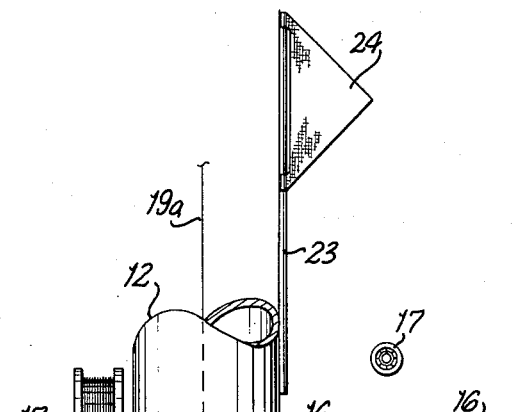
FIG. 2 is a side view of the pole submerged within an ice fishing hole and means to position the pole within the hole.
Figure 1:
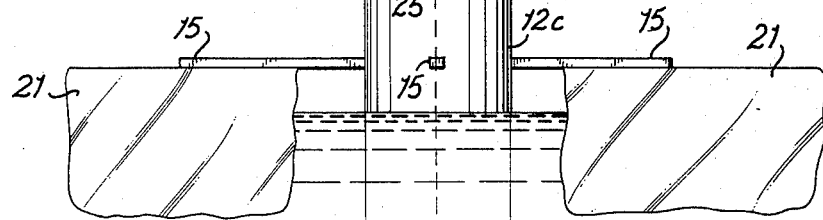
FIG. 1 is an end view of the pole showing support means for positioning the pole in an ice fishing hole.
Figure 1:
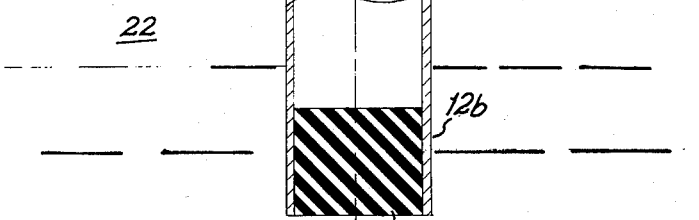
Figure 1:
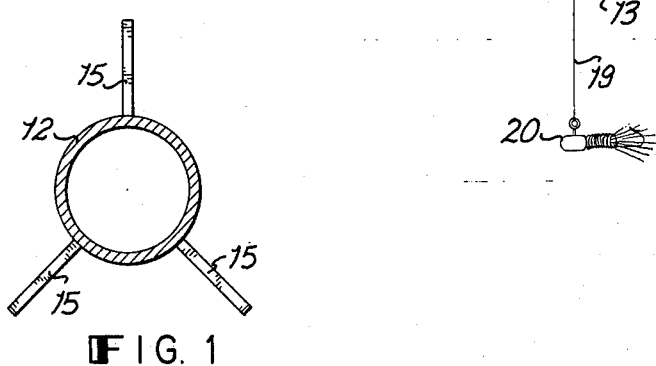

Referring to the drawings, my new chamber ice fishing pole apparatus is designated by the numeral 11 as seen in FIG. 2 and includes a pipe or suitable hollow object numeral 12 and is further noted in section numerals 12a as being the upper end above ice and 12b as the submerged end in water 22 and 12c as the area of the cavity of air. Numeral 12c is a cavity of air between the seal 13 and a point anywhere on pipe that is or has an opening. In FIG. 2 cavity 12c is between the hole 25 and the seal 13. Fishing line 19 is projected through hole 25 and on through chamber 12 projecting beyond the end without seal 13 or 14 being in or on chamber, this allows you to pierce the fishing line through 13 or 14 without much problem, with a needle or a bent piece of wire or a needle threader, and same if line is broken or you wish to change fishing line, you then affix seal 13 or 14 in or on end of chamber and attach on your fish hook 20 to your line 19. Spool 18 is the same as line 19 is purchased on, and 16 is a pin that is put through pipe 12 by drilling holes for same, after putting spool 18 on pin 16 you secure by placing self locking washer 17 on pin 16 against spool 18, or you may use a nut and bolt instead of pin 16 and washer 17.

The support arms numerals 15 is old in the art employed on many objects and things, and are necessary for the chamber ice fishing pole 11. They may be affixed in many ways including adjustable, or stationary like support arms 15 to rest on the ice 21, in use the style to be a matter of choice. The suitable hollow object may not require support arms to support it on the ice 21, as a suitable hollow object could be a funnel or cone shape etc. to rest on edge of ice 21.

If line 19a is desired to be used from top of chamber 12, then fishing line 19a will replace 19, and there will be no use for hole 25, spool 18, shaft 16, and washer 17. Which is the intention of this apparatus.

The signal device of cloth 24 adhered to shaft 23 is also old in the art and may be devised on chamber 12 by anyone skilled in the art, as ice fishermen are, and would be a matter of choice.

Accordingly, in view of the foregoing it is thought a full understanding of the method of ice fishing in the water of an ice fishing hole and the apparatus to employ such method will be had and the advantages of the same will be appreciated.

I claim:
1. In a device for ice fishing, a chamber ice fishing pole comprising,
   a pipe having first and second open ends,
   support means extending from near the center of the length of said pipe to support said second end of said pipe below the surface of the water in an ice fishing hole,
   a hole through the surface of said pipe between said first end and said support means for passage of a fish line into a chamber formed by the interior of said pipe,
   seal means in covering relation to said second end comprising a rubber seal having a normally closed slit therethrough for passage of said fish line from said chamber to said water in a water sealing relationship with said seal, said seal dimensioned to fit the said second end in a water-tight relationship with said pipe, thus forming an airtight chamber within said pipe.

* * * * *